United States Patent [19]

Rich

[11] Patent Number: 5,065,305

[45] Date of Patent: Nov. 12, 1991

[54] ROTARY PHASE CONVERTER HAVING CIRCUITY FOR SWITCHING WINDINGS TO PROVIDE REDUCED STARTING CURRENT WITH RAPID, DEPENDABLE STARTING

[75] Inventor: Hubert F. Rich, Shelbyville, Ind.

[73] Assignee: Arco Electric Products Corp., Shelbyville, Ind.

[21] Appl. No.: 542,035

[22] Filed: Jun. 22, 1990

[51] Int. Cl.[5] .............................................. H02M 5/32
[52] U.S. Cl. .................................. 363/150; 318/771; 318/768
[58] Field of Search ................ 363/150; 318/768, 769, 318/771, 778

[56] References Cited

U.S. PATENT DOCUMENTS

| | | | |
|---|---|---|---|
| 1,502,909 | 7/1924 | Deflassieux | 318/771 |
| 1,849,519 | 3/1932 | Gay | 318/771 |
| 1,901,586 | 3/1933 | Early | 318/771 |
| 1,902,444 | 3/1933 | Hobart et al. | 318/771 |
| 3,016,482 | 1/1962 | Andersen et al. | 318/773 |
| 3,670,238 | 6/1972 | Ronk | 363/150 |
| 4,079,446 | 3/1978 | Hertz | 318/769 |

Primary Examiner—David Smith, Jr.
Attorney, Agent, or Firm—Terry M. Crellin

[57] ABSTRACT

A starting system for a rotary dynamoelectric converter is disclosed. The converter is of the type having three sets of windings wired in either delta or wye configuration. Each set of windings consists of two coils normally connected in parallel within the respective winding, and the converter has three leads connected to the delta or wye configurations. Two of the leads are to be connected to a source of single-phase, alternating current, and a run capacitor is connected between one of the first two leads and the third lead, such that three-phase current can be drawn from the three leads when the dynamoelectric converter is running at its normal operating speed. The starting system comprises a mechanism for connecting the two coils in each respective winding in series with each other when single-phase current is initially connected to the first two leads to start the converter. When the rotor of the converter comes up to operating speed, the two coils in each winding is reconnected in parallel with each other.

2 Claims, 3 Drawing Sheets

F I G. I

ROTARY PHASE CONVERTER HAVING CIRCUITY FOR SWITCHING WINDINGS TO PROVIDE REDUCED STARTING CURRENT WITH RAPID, DEPENDABLE STARTING

BACKGROUND OF THE INVENTION

1. Field of the Invention

The present invention relates to rotary phase converters for converting a single-phase, alternating current to three-phase, alternating current. In particular, the invention relates to improved rotary phase converters having means for switching the pair of coils in each of the windings of the converter from parallel connection to series arrangement during start-up of the converter, and then switching the pair of coils back to the parallel connection when the converter comes up to its normal operating speed.

2. State of the Art

The prior art has recognized that single-phase power can be converted to three-phase current for powering three-phase motors. Devices that develop three-phase, alternating current from a single-phase power source include rotary, dynamoelectric converters comprising an induction motor powered by single-phase current and producing three-phase current. Examples of such rotary converters are shown in U.S Pat. Nos. 4,777,421; 4,719,560; 4,158,225; 4,656,575; and 3,387,202. The converters must be started and brought up to speed from the single-phase input current. Because the three-phase motor of the converter starts slowly, if at all, on single-phase current and comes up to operating speed very slowly, the prior art has found several ways of modifying the converter motor to improve the starting characteristics.

As shown from the prior patents mentioned above, the modifications have taken three different approaches. In one approach, as exemplified in U.S. Pat. No. 4,656,575, starting and run capacitors are connected from one of the single-phase inputs of the converter to the non-powered output lead of the converter. Elaborate switching means must be provided for switching the starting capacitance into the circuit during start up and out of the circuit when the converter has attained operating speed. Another approach, as exemplified in U.S. Pat. No. 4,158,225 has been to provide a high resistance rotor for the converter. The third approach, as exemplified in U.S. Pat. No. 3,387,202, used a separate starting motor to start the converter motor and bring the converter motor up to speed prior to supplying a three-phase output.

3. Objectives

A principal objective of the invention is to provide a rotary phase converter that can be used in driving large, three-phase motors from single-phase power lines, with the converter having a novel starting system that uses exceptionally low starting current while accomplishing rapid, acceleration of the converter to its operating speed.

A particular objective of the present invention is to provide a rotary phase converter having a novel starting system that operates effectively with a rotor of low resistance resulting in improved performance and increased life expectancy of the converter.

Another objective of the present invention is to provide a rotary phase converter having a novel starting system that does not require specialized electrolytic or dry cell capacitors in the converter circuitry during start up or the related control devices and switch gear necessary to remove the specialized capacitors from the converter circuitry during normal operation.

A still further objective of the present invention is to provide a rotary phase converter that will start every time consistently, even in extreme cold temperatures.

BRIEF DESCRIPTION OF THE INVENTION

The above objectives are achieved in accordance with the present invention by providing an improvement in the starting system of a rotary dynamoelectric converter used in converting single-phase, alternating current to three-phase, alternating current. The converter is of the conventional type having three sets of windings wired in either delta or wye configuration. Each set of windings consists of two coils normally connected in parallel within the respective winding, and the converter has three leads connected to the delta or wye configurations. Two of the leads are to be connected to a source of single-phase, alternating current, and a run capacitor is connected between one of the first two leads and the third lead, such that three-phase current can be drawn from the three leads when the dynamoelectric converter is running at its normal operating speed. The improvement in accordance with the present invention consists of simple, inexpensive and reliable means for connecting the two coils in each respective winding in series with each other when the single-phase current is initially connected to the first two leads to start the converter. Additionally, similar means are provided for reconnecting the two coils in each winding in parallel with each other when the dynamoelectric converter comes up to its normal operating speed.

It has been found that the converter starts and rapidly comes up to operating speed by altering the pair coils in each winding so that on start up the coils are wired in series with each other rather than normal parallel wiring. Apparently, the increase in resistance achieved by the coils being wired in series in each winding produces an effective increase in voltage in the generated phase, i.e., the phase or winding of the three-phase system which is not connected to either of the two leads which are energized by the source of single-phase current. The result is a very smooth, rapid acceleration to operating speed with a starting current of 25% of the normal starting current for a similar sized, conventional converter. The coils in each of the windings of the converter are reconnected through appropriate switch means to parallel configuration when proper speed has been attained, and the converter operates in its normal fashion.

With the starting system of the present invention, the voltage in the three windings are near equal, and a low resistance rotor can be used instead of high resistance rotors of the prior art. The low resistance rotor is superior mechanically and electrically to a high resistance rotor, thus longer life and improved performance is achieved in comparison to a converter using a high resistance rotor. With the starting system of the present invention, there is no need for troublesome devices such as electrolytic capacitors and their related control switching mechanisms as are required in many of the converters of the prior art. Further, since the voltage in each of the windings is nearly equal during the starting cycle, all starting cycles are successful even in extremly cold temperatures.

Additional objects and features of the invention will become apparent from the following detailed description, taken together with the accompanying drawings.

THE DRAWINGS

Preferred embodiments of the starting system of a rotary phase converter representing the best modes presently contemplated of carrying out the present invention are illustrated in the accompanying drawings in which.

DETAILED DESCRIPTION OF THE ILLUSTRATED EMBODIMENTS

As mentioned previously, the present invention relates to an improvement in a system for starting a rotary phase converter from single-phase current. The rotary phase converter itself is well known in the prior art. The wiring of the windings of such rotary phase converters can be either delta or wye configuration, and the improvement of the present invention applies equally to either configuration.

Figure 7:
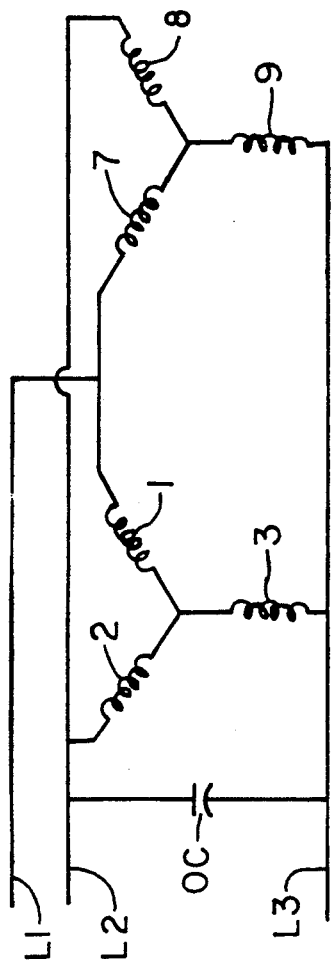
FIG. 7 is a schematic diagram similar to that of FIG. 6 but showing the wiring of the windings during normal operation of the converter following start up.
Figure 5:
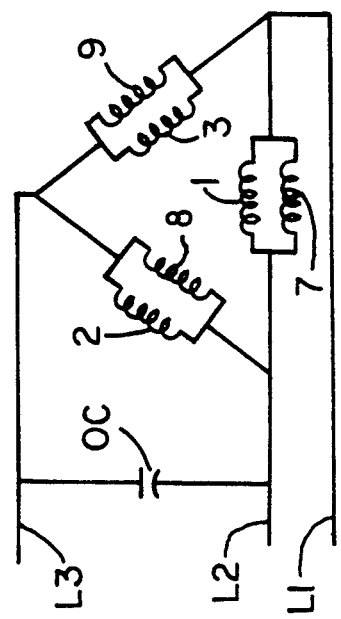
FIG. 5 is a schematic diagram similar to that of FIG. 4 but showing the wiring of the windings during normal operation of the converter following start up.

The construction of rotary phase converters are well known and need not be discussed extensively herein. Basically, the converters have three sets of windings 12, 13 and 14 as best shown in FIGS. 5 and 7 which illustrate the windings in normal running operation of the converter. Two of the phases or legs of the delta or wye wiring are adapted to be connected to a source of single-phase, alternating current. In the drawings, these two legs are identified by the reference numerals L1 and L2. The third leg is identified by the reference numeral L3. The third leg is the generated third phase of the three-phase output. A run capacitor OC is connected between one of the two legs L1 and L2 and the third leg L3. As known, three-phase current can be withdrawn from legs L1, L2 and L3 during operation of the converter. The three-phase power is developed from sin-glephase current applied to the legs L1 and L2. The sizing of the run capacitor is done in accordance with the output rating of the converter as is well known in the art. The run capacitor, usually a bank of oil filled capacitors, is shown by the single symbol identified by the reference number OC in the drawings.

Figure 4:
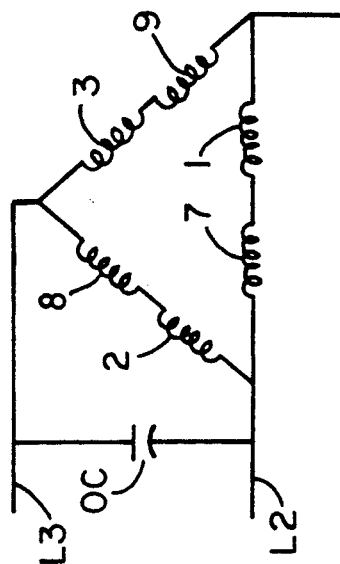
FIG. 4 is a schematic diagram showing the wiring of the windings of a converter wound in delta configuration during start up of the converter in accordance with the present invention.

In accordance with the present invention, there is provided an improved system for starting the converter and rapidly accelerating the rotor of the converter to its normal operating speed. Means are provided for altering the wiring of the pairs of coils in each winding during start up such that the two coils in each respective winding 13, 14 and 15, as is best shown in FIGS. 4 an 6, are connected in series with each other. Once the rotor of the converter has come up to operating speed, the wiring of the two coils in each of the windings is reconnected so that the coils are in parallel with each other as best shown in FIGS. 5 and 7.

The improvement in accordance with the present invention preferably comprises an electrically activated switch member to be described hereinafter which has first and second operating positions. The first operating position connects the two coils of each respective winding in series with each other, and the second operating position connects the two coils of each respective winding in parallel with each other. A first electrical activator directs the switch member to its first operating position during start up of the dynamoelectric converter. The switch member is held in its first operating position until the converter has attained its operating speed. When the dynamoelectric converter comes up to its normal operating speed, a second electrical activator functions to deactivate the first activator and direct the switch member to its second operating position.

Figure 1:
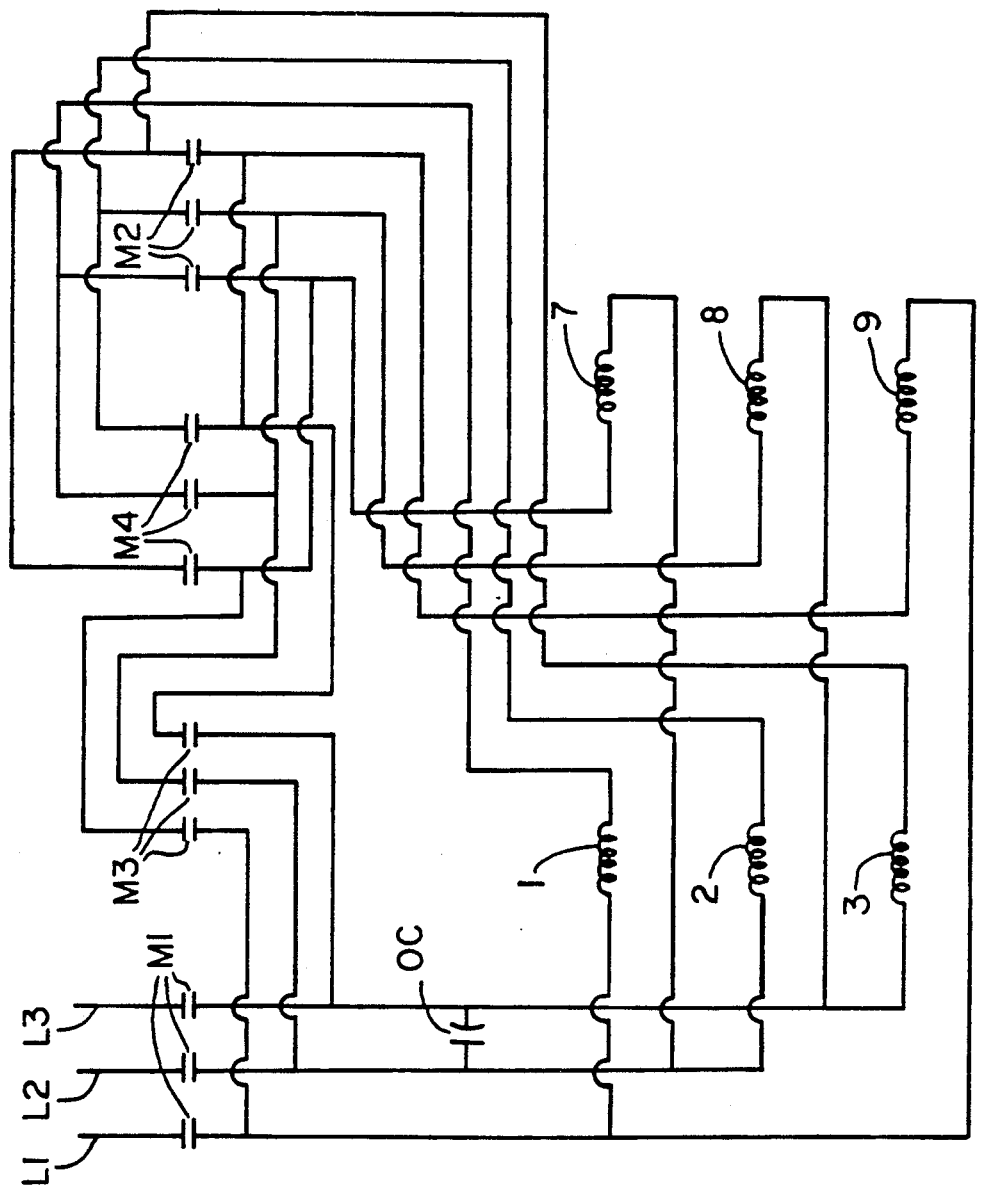
FIG. 1 is a schematic diagram of one preferred embodiment of a starting system in accordance with the present invention, showing the coils of the windings of the converter wired in delta configuration.
Figure 2:
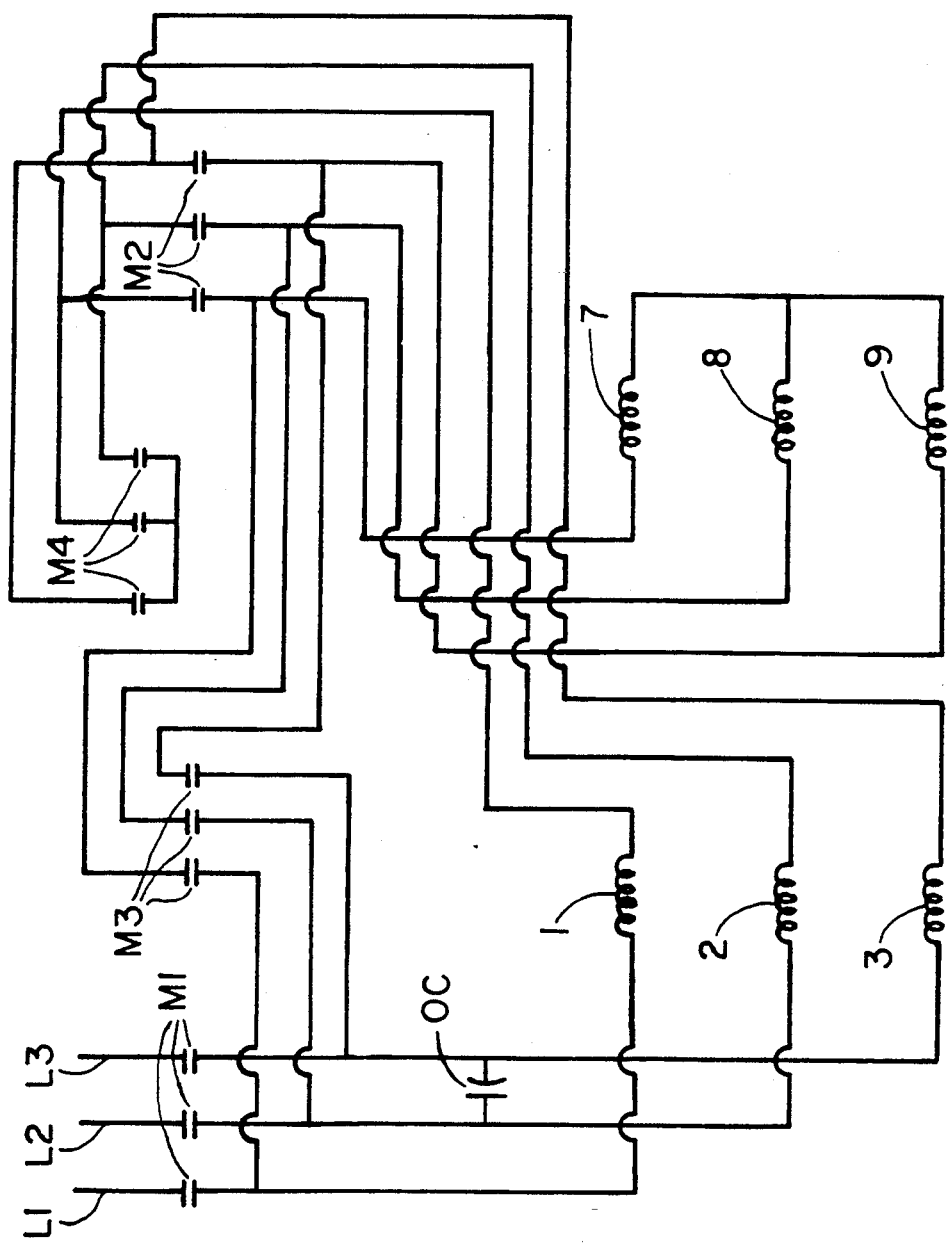
FIG. 2 is a schematic diagram of a second preferred embodiment of a starting system in accordance with the present invention, showing the coils of the windings of the converter wired in wye configuration.
Figure 3:
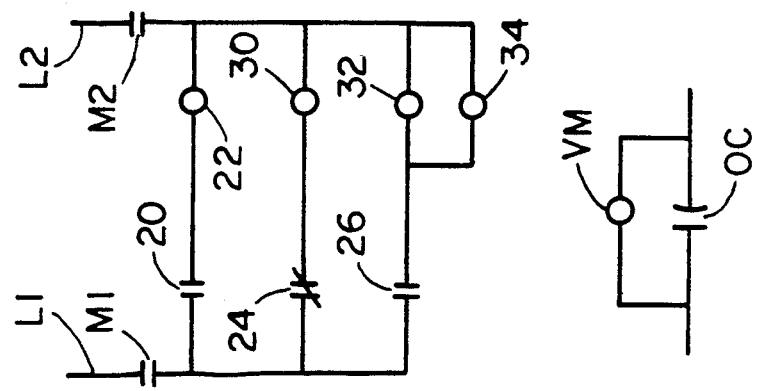
FIG. 3 is schematic diagram of a preferred controller for operating the switches in both of the embodiments of the starting system shown in FIGS. 1 and 2.

Referring now to FIGS. 1-3, a preferred embodiment of the starting system, including the switch member and first and second activators mentioned above, will be described. As shown in FIG. 3, the system comprises a solid state voltage monitor VM connected across the run capacitor OC. The voltage monitor VM has normally open contacts 20 associated therewith, with the voltage monitor being adapted to close the contacts 20 upon monitoring a voltage of sufficient magnitude across the capacitor OC. The contacts 20 and a coil 22 of a two pole, double throw relay switch are connected in series between the two legs L1 and L2 of the single-phase power supply. The relay switch comprises normally closed contacts 24 and normally open contacts 26.

The contacts 24 and a coil 30 of a three pole, single throw switch are also connected in series between the two legs L1 and L2. The contacts of the three pole, single throw switch are shown by the reference numeral M2 in FIGS. 1 and 2 of the drawings. The contacts 24 remain closed whenever coil is not energized. The normally open contacts 26 of the relay switch are wired in series between legs L1 and L2 with coils 32 and 34 of two three pole, single throw switches. The contacts of these latter switches are shown by the reference numerals M3 and M4 in FIGS. 1 and 2 of the drawings. The contacts 26 are closed only when the coil 22 is energized.

The combination of contacts M2, M3 and M4 and their respective relay coils comprise the electrically activated switch member referred to previously. As will be seen from the discussion of the operation of the starting system given hereinafter, the composite switch member comprising contacts M2, M3 and M4 has a first operating position in which the respective coils in each winding is connected in series and a second operating position in which the respective coils are connected in parallel with each other.

The normally closed contacts 24 and the normally open contacts 26 associated with the voltage monitor VM form the first electrical activator as referred to above for controlling the switch member having the contacts M2, M3 and M4 to the first operating position. The voltage monitor VM and its associated contacts 20 and switch coil 22 form the second electrical activator as referred to above for controlling the switch member to the second operating position.

The operation of the starting system will now be discussed. A main switch, comprising three pair of make and break contacts M1 as shown in FIGS. 1 and 2, is closed to connect the three legs of the windings to the two leads coming from the source of single-phase current and the outlet lead which will be used as the converted third phase from the converter. The contacts 20 of the voltage monitor remains open inasmuch as there is insufficient voltage across the run capacitor OC to activate the voltage monitor VM. Coil 22 remains non-energized so that the normally closed contacts 24 remain closed. Coil 30 is energized through the normally closed contacts 24, and the contacts M2 are thus closed. Contacts M3 and M4 remain open inasmuch as the coils 32 and 34 associated therewith are not energized.

Figure 6:
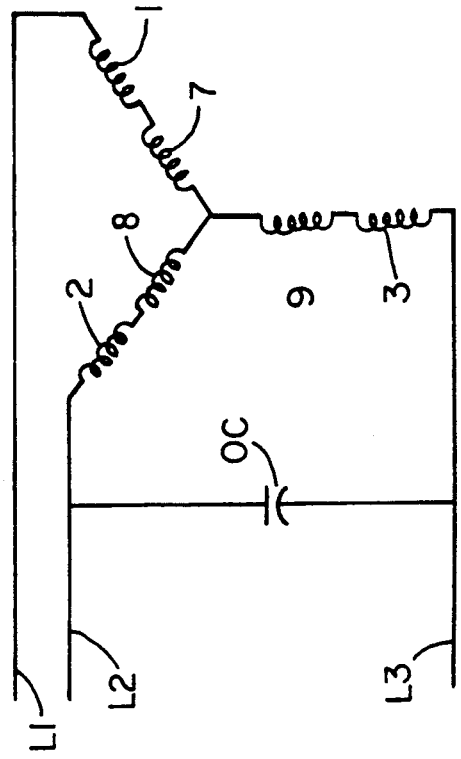
FIG. 6 is a schematic diagram showing the wiring of the windings of a converter wound in wye configuration during start up of the converter in accordance with the present invention.

In this starting condition, the pairs of coils 1 and 7, 2 and 8, and 3 and 9 of the windings are connected in series with each other within each winding. FIGS. 1 and 4 show a converter winding wired in delta configuration. The series arrangements of the pairs of coils in each winding are best shown in FIG. 4 and can be confirmed if so desired by comparing the wiring of FIG. 1 with the contacts M2 being closed and the contacts M3 and M4 being open. FIGS. 2 and 6 show a converter winding wired in wye configuration. The series arrangements of the pairs of coils in each winding are best shown in FIG. 6 and can be confirmed if so desired by comparing the wiring of FIG. 2 with the contacts M2 being closed and the contacts M3 and M4 being open.

In the starting condition a voltage is induced across the run capacitor OC and the third phase of the converter windings. The rotor of the converter rapidly accelerates to operating speed. The magnitude of the voltage across the run capacitor increases in proportion with the speed of the rotor. As the rotor approaches its normal operating speed, the magnitude of the voltage across the run capacitor OC is such as to activate the voltage monitor VM to close the otherwise open contacts 20. The closing of contacts 20 energizes the coil 22 of the two pole, double throw switch. As a result, the normally closed contacts 24 open to deenergize the coil 30 associated with contacts M2, and the contacts M2 open.

The normally open contacts 26 close upon the energizing of coil 22, and the closed contacts 26 energize the coils 32 and 34 to close the contacts M3 and M4. In this run condition, the pairs of coils 1 and 7, 2 and 8, and 3 and 9 of the windings are connected in conventional, parallel configuration within each winding. FIGS. 1 and 5 show a converter winding wired in the delta configuration. The parallel arrangements of the pairs of coils in each winding are best shown in FIG. 5 and can be confirmed if so desired by comparing the wiring shown in FIG. 1 with the contacts M2 being open and the contacts M3 and M4 being closed. FIGS. 2 and 7 show a converter winding wired in wye configuration. The parallel arrangements of the pairs of coils in each winding are best shown in FIG. 7 and can be confirmed if so desired by comparing the wiring shown in FIG. 2 with the contacts M2 being open and the contacts M3 and M4 being closed.

Although preferred embodiments of the improved rotary phase converter of the present invention have been illustrated and described, it is to be understood that the present disclosure is made by way of example and that various other embodiments are possible without departing from the subject matter coming within the scope of the following claims, which subject matter is regarded as the invention.

I claim:

1. In a rotary dynamoelectric converter for converting single-phase, alternatinng current to three-phase, alternating current, said converter being of the type having three sets of windings wired in either delta or wye configuration, wherein each set of windinngs consists of two coils normally connected in parallel within the respective winding, said converter further having three leads connected to the delta or wye configurations, with two of the leads being connected to a source of single-phase alternating current and with a run capacitor connected between one of the first two leads and the third lead, such that three-phase current can be drawn from the three leads when the dynamoelectric converter is running at its normal operating speed, an improvement consisting of an electrically activated switch member having first and second operating positions wherein the first operating position connects the two coils of each respective winding in series with each other and the second operating position connects the two coils of each respective winding in parallel with each other;

a first electrical activator that activates said switch member to its first operating position when single phase current is initially connected to the first two leads and the dynamoelectric converter has not yet attained its operating speed;

a second electrical activator that deactivates said first activator and further activates said switch member to its second operating position when the dynamoelectric converter comes up to its normal operating speed a voltage monitor for monitoring the voltage developed across the run capacitor;

a monitor switch that is connected to source of electrical energy, with said monitor being controlled by the voltage monitor to close only when the voltage across the run capacitor attains a preselected magnitude;

a relay coil in series with said monitor switch so that the relay coil is energized when the monitor switch is closed;

said first electrical activator comprises a first relay switch which when closed provides elestrical current to activities said switch member to its first operating position, said first relay switch being resposive to said relay coil to close when the relay coil is not energized and to open when the relay coil is energized; and said second electrical activator comprises a second relay switch when closed provides electical current to activate said switch member to its second operating position, said second relay switch being responsive to said relay coil to close when the relay coil is energized and to open when the relay coilis not energized.

2. A method of starting a rotary dynamoelectric converter for converting single-phase, alternating current to three-phase, alternating current, wherein said converter has three sets of windings with each set of windings consisting of two coils normally connected in parallel within the respective winding, said converter further having three leads connected to the delta or wye configurations, with two of the leads being connected to a source of single-phase, alternating current and with a run capacitor connected between one of the first two leads and the thrid lead, such that three-phase current can be drawn from the three leads when the dynamoelectric converter is running at its normal operating speed, said method comprising switching the two coils in each respective winding in series with each other;

supplying a single-phase current to the first two leads;

measuring the speed of the dynamoelectric converter by monitoring the voltage across the run capacitor; and switching the two coils in each respective winding back to normal, parallel connection when a preselected magnitude of voltage is monitored across the run capacitor.

* * * * *